United States Patent
Li et al.

(10) Patent No.: US 11,279,655 B2
(45) Date of Patent: Mar. 22, 2022

(54) METHOD OF MAKING WATERPROOF MAGNESIUM OXYCHLORIDE REFRACTORY BRICK BY FLY ASH FROM MUNICIPAL SOLID WASTE INCINERATION

(71) Applicant: TSINGHUA UNIVERSITY, Beijing (CN)

(72) Inventors: Jinhui Li, Beijing (CN); Yang Li, Beijing (CN); Quanyin Tan, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 16/448,780

(22) Filed: Jun. 21, 2019

(65) Prior Publication Data

US 2020/0399182 A1 Dec. 24, 2020

(51) Int. Cl.
*C04B 35/04* (2006.01)
*C04B 35/63* (2006.01)

(52) U.S. Cl.
CPC .......... *C04B 35/04* (2013.01); *C04B 35/6303* (2013.01); *C04B 2235/3201* (2013.01);
(Continued)

(58) Field of Classification Search
CPC . C04B 28/32; C04B 35/04; C04B 2235/9669; C04B 2235/94;
(Continued)

(56) References Cited

U.S. PATENT DOCUMENTS

| 644,953 A | * | 12/1898 | Ulrich | |
| 4,820,345 A | * | 4/1989 | Berg | ........................ C04B 28/30 |
| | | | | 106/18.12 |
| 2013/0000520 A1 | * | 1/2013 | Wu | ........................ C04B 12/027 |
| | | | | 106/690 |

FOREIGN PATENT DOCUMENTS

| CN | 103979921 | * | 8/2014 |
| CN | 108658569 | * | 10/2018 |
| CN | 109160767 | * | 1/2019 |

OTHER PUBLICATIONS

Chau, C. K., James Chan, and Zongjin Li. "Influences of fly ash on magnesium oxychloride mortar." Cement and Concrete Composites 31.4 (2009): 250-254. (Year: 2009).*

(Continued)

*Primary Examiner* — Karl E Group
*Assistant Examiner* — Cameron K Miller
(74) *Attorney, Agent, or Firm* — Hauptman Ham, LLP

(57) ABSTRACT

The invention discloses a method of making waterproof magnesium oxychloride refractory brick using fly ash from municipal solid waste incineration (MSWFA). The solidification and stabilization of heavy metals in MSWFA is achieved by the chemical action of a sulfur-containing compound and a physical wrapping of a geopolymer. The large amount of chloride ions in MSWFA is also reused in the manufacture of magnesium oxychloride refractory brick, which requires a high chlorine environment. This method, with the inclusion of the geopolymer, also produces refractory brick exhibiting improved water resistance relative to traditional magnesium oxychloride refractory brick, thereby allowing the improved magnesium oxychloride refractory brick to be used in a wider range of applications.

13 Claims, 1 Drawing Sheet

(52) U.S. Cl.
CPC ............... *C04B 2235/3206* (2013.01); *C04B 2235/3427* (2013.01); *C04B 2235/444* (2013.01); *C04B 2235/446* (2013.01); *C04B 2235/5427* (2013.01); *C04B 2235/6567* (2013.01); *C04B 2235/94* (2013.01); *C04B 2235/9669* (2013.01)

(58) Field of Classification Search
CPC .... C04B 2235/6567; C04B 2235/5427; C04B 2235/446; C04B 2235/444; C04B 2235/3427; C04B 2235/3206; C04B 2235/3201; C04B 35/6303; Y02W 30/91
See application file for complete search history.

(56) References Cited

OTHER PUBLICATIONS

Hicks, James. "Utilization of Coal Combustion By-Products and Green Materials for Production of Hydraulic Cement." Industrial Waste (2012): 191. (Year: 2012).*

First Office Action issued in corresponding Chinese Application No. 201810208940.8; dated Apr. 25, 2019; The State Intellectual Property Office of the People's Republic of China, 11 pgs.

* cited by examiner

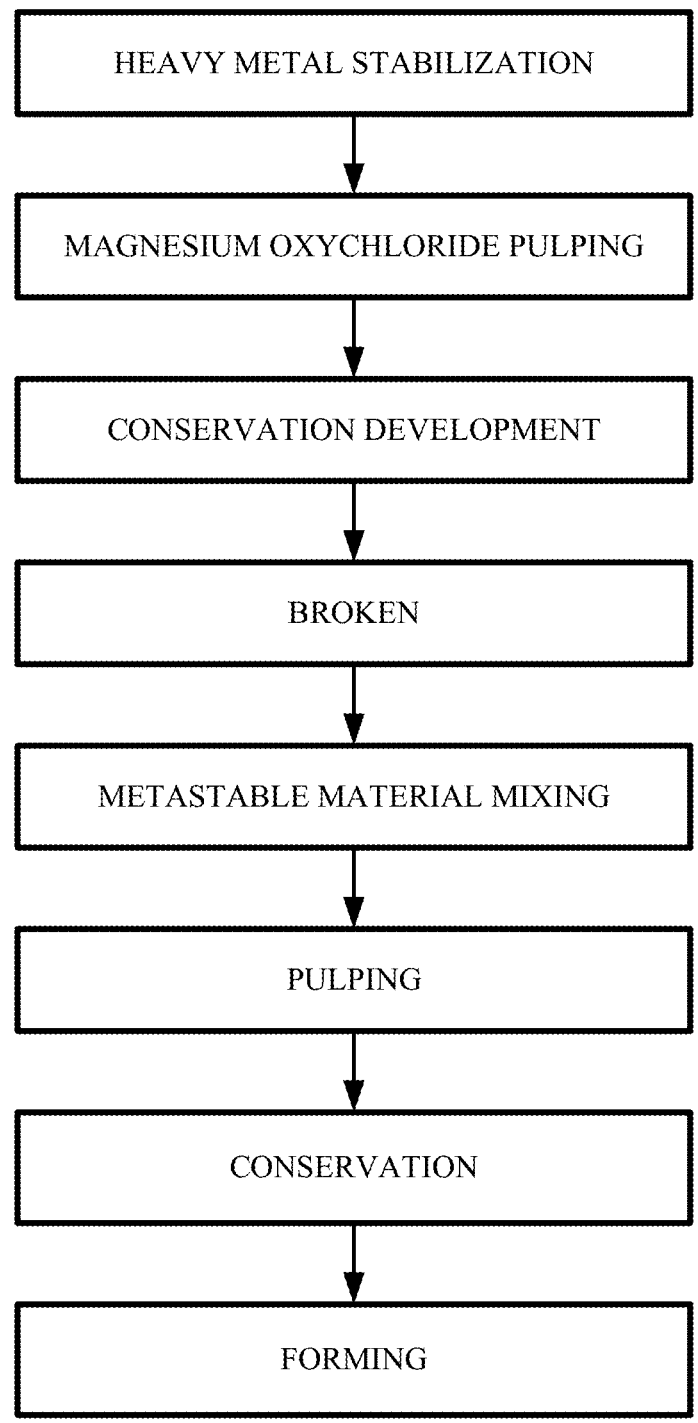

METHOD OF MAKING WATERPROOF MAGNESIUM OXYCHLORIDE REFRACTORY BRICK BY FLY ASH FROM MUNICIPAL SOLID WASTE INCINERATION

TECHNICAL FIELD

The invention is about a method of making waterproof magnesium oxychloride refractory brick by fly ash from municipal solid waste incineration, which belongs to the technical field of utilization of hazardous waste for building materials.

BACKGROUND TECHNOLOGY

Municipal solid waste incineration fly ash (fly ash) refers to the residues collected in flue gas purification system and heat recovery system (such as heat saver, waste heat boiler, etc.).

Result from the volatilization and migration of heavy metals, a large amount of heavy metals, such as Hg, Pb, Cd, Cu, Cr, Zn, Ni, are enriched in fly ash during incineration. According to the report, the highest content of Zn, Cu, Pb, Cd, Cr and Ni in fly ash from municipal solid waste incineration in China can reach 17 000 mg/kg, 12 000 mg/kg, 30 000 mg/kg, 5 000 mg/kg, 3 500 mg/kg and 1 500 mg/kg respectively. It is difficult to excrete the heavy metals when they enter the human body. If the content enriched in human body exceeds to a certain extent, the nervous system, digestive system, reproductive system, immune system and skeleton of the human body can be directly damaged, which results in the human enzyme activity reduction, language and motor disorders, liver and kidney damage, bone loss, carcinogenesis, teratogenesis, mutagenicity, neurasthenia, anemia, and even death. Fly ash belongs to the hazardous industrial solid waste, it is listed in the Chinese National Hazardous Waste List as early as 2008, and still appears in the 2016 edition of the list.

In recent years, municipal solid waste incineration power plant has developed rapidly in China. By the end of 2015, 219 municipal solid waste incineration plants have been built in China, with an annual disposal capacity of 80 million tons. With the development of incineration technology, nearly 5 million tons of fly ash are produced annually, accounting for nearly 12% of the total amount of hazardous wastes produced annually in China.

Fly ash, as a hazardous industrial solid waste treatment problem, is one of the key environmental problems and city management issues. At present, the main treatment method of fly ash is landfill after solidification and stabilization. Although the 2016 edition of the Chinses National Hazardous Waste List exempts fly ash stabilized from entering municipal solid waste landfills, landfills are only temporary measures under the current situation of garbage siege. In China, it is admitted that recycle is the key issue for industrial solid waste. Because industrial solid waste is rich in Si, Al, Ca and other elements, building materials production industry is the largest industry to reuse industrial solid waste. According to the statistics of China Environmental Protection Industry Association, in 2013, 43% of tailings, 68% of coal gangue, 93% of fly ash and most of steel smelting slag were used in building materials production and road construction. The main elements of fly ash are Si, Al, Fe, Mg, Ca, K, Na and Cl. $SiO_2$, $Al_2O_3$, CaO, $Fe_2O_3$, $Na_2O$ and $K_2O$ are ubiquitous in fly ash. $SiO_2$ content is 6.35-35.5%, $Al_2O_3$ content is 0.92-13.7%, $Fe_2O_3$ content is 0.63-10.5%, CaO content is 16.6-45.4%, MgO, $Na_2O$ and $K_2O$ account for 1-5% respectively. Such element composition provides the necessary basis for the reusing fly ash as building materials. Fly ash reusing as building materials is the main research and application direction in the future.

Magnesium oxychloride cement has a history of nearly 90 years in China. Magnesium oxychloride cement is a pneumatic cement with excellent high temperature resistance, high strength, high wear resistance and low density. Solid waste is often used as admixture in the production of magnesium oxychloride cement. The reason is that the strength of magnesium oxychloride cement is very high, so it can still meet the strength requirements after a large amount of solid waste being added, and the maximum admixture amount can reach 60%. This is the characteristic and advantage of magnesium oxychloride cement, but the shortcomings are also obvious. The water resistance of magnesium oxychloride cement is very poor. Its hardened body will gradually lose 60-80% of its strength in water, which limits its application.

SUMMARY OF THE INVENTION

The invention is to provide a method for making waterproof magnesium oxychloride refractory brick by fly ash from municipal solid waste incineration which is used as admixture. The waterproof magnesium oxychloride refractory brick from this method combines two materials, the geopolymer gel and the magnesium oxychloride gel, which possess different properties of fire resistance and water resistance, and the coexistence of geopolymer gel and magnesium oxychloride gel achieves the multi-stage solidification and stabilization of heavy metals and improving the water resistance of magnesium oxychloride refractory brick.

The invention provides a method of making waterproof magnesium oxychloride refractory brick by fly ash from municipal solid waste incineration, which comprises the following steps:

(1) Sulfur-containing compound and water are mixed into the fly ash and stirred evenly to make stabilized slurry, the heavy metals are stabilized and CaO is turned to $Ca(OH)_2$ during this process;

(2) The aqueous solution of MgO and $MgCl_2$ is added into the stabilized slurry which is obtained in the step (1), after being stirred evenly, magnesium oxychloride slurry is prepared;

(3) The magnesium oxychloride obtained in step (2) is cured to make magnesium oxychloride gel;

(4) The magnesium oxychloride gel in the step (3) is crushed to obtain magnesium oxychloride aggregate;

(5) The blended slurry is prepared by mixing metastable material, alkali metal hydroxide, $Na_2SiO_3$, water and magnesium oxychloride aggregate obtained in step (4);

(6) The waterproof magnesium oxychloride refractory brick is obtained by curing and shaping the blended slurry obtained in step (5)

According to claims 1 in this method, the characteristics are that the sulfur-containing compound in claim 1 is inorganic sulfide or organic sulfide; the inorganic sulfide is $Na_2S$ The dosage of the sulfur-containing compound is 6%~9% of fly ash dry mass, which could be 6%, 7%, 9% or 8% in different cases;

The dosage of the water is 40%-50% of fly ash dry mass; which could be 40% or 50% in different cases.

The temperature for stirring and homogenization is 40-50° C., which could be 45-50° C., 45° C. or 50° C. in different cases.

The time of stirring and homogenization is 15-30 minute, which could be 20 minutes in different cases.

The $S^{2-}$ released from $Na_2S$ in stabilized slurry can precipitate heavy metals in fly ash, in the meantime, $Na_2S$ can produce a mass of NaOH equal to the mole of $S^{2-}$ to continue precipitating heavy metals and activate soil aggregation reaction which can complete the first solidification and stabilization of heavy metals; the purpose of stirring for 20 minutes is to homogenize the slurry and make f-CaO turn to $Ca(OH)_2$ for eliminating internal stress produced by f-CaO.

According to this method, the dosage of MgO in steps (2) is 35%-45% of fly ash dry mass, which could be 40% in different cases.

The light calcinesia magnesia (80# or 85#) is used for this invention.

In the aqueous solution of the $MgCl_2$, the dosage of $MgCl_2$ is 13%-16% of fly ash dry mass, which could be 13%-15%, 15% or 13% in different cases; the dosage of water is 45%-55% of fly ash dry mass, which could be 45%, 55% or 50% in different cases.

The $MgCl_2$ in steps (2) is industrial grade magnesium chloride.

The temperature for stirring and homogenization is 40-50° C. in steps (2), which could be 45-50° C., 45° C. or 50° C. in different cases.

The time of stirring and homogenization is 5-10 minute, which could be 5 minutes in different cases.

According to this method, the condition of curing in steps (3) is ventilated, rainproof and 20-25° C. (e.g. 22° C., 20° C. or 25° C.);

The time of curing in mold is 2-4 days (e.g. 3 days), and the time of the mold-opening curing is 3-5 days (e.g. 4 days) after curing in mold.

The compressive strength of the magnesium oxychloride gel can reach more than 10 MPa.

During the curing, the crystal compound salt gels, $5Mg(OH)_2 \cdot MgCl_2 \cdot 8H_2O$ and $3Mg(OH)_2 \cdot MgCl_2 \cdot 8H_2O$, are generated by MgO and $MgCl_2$. The crystal compound salt gels is an air hardening cementitious material and releases heat during the generation, therefore, magnesium oxychloride slurry must be cured in the raintight, 20-25° C. and ventilated environment. After mold-opening, curing continues for the form of crystal compound salt gels and water evaporation. The gel with mechanical strength completes the second solidification and stabilization of heavy metals.

According to the method, the magnesium oxychloride gel in steps (4) is crushed to less than 4 meshes (particle size<4.75 mm).

According to the method, the mass ratio of the magnesium oxychloride aggregate, metastable material, alkali metal hydroxide, $Na_2SiO_3$ and the water is 100:(40-55):5:1.5:(25-35) in steps (5), which could be 100:45:5:1.5:(25-35), 100:45:5:1.5:(25-30), 100:45:5:1.5:(30-35), 100:45:5:1.5:30, 100:45:5:1.5:25 or 100:45:5:1.5:35 in different cases.

The alkali metal hydroxides are NaOH or KOH.

The metastable material is but not limited to fly ash, blast furnace slag or metakaolin, which is from quenching treatment and rich in Si and Al;

The particle size of the metastable material is less than 75 μm;

The time of stirring and homogenization is 5 to 10 minutes, which could be 5 mins in different cases.

According to the method, the blended slurry must be cured within 15 minutes after preparation are completed in steps (6).

Firstly, curing in mold takes 1 day in the condition of 70-80° C. (e.g. 70-75° C., 75° C., or 70° C.), <20% relative humidity. Secondly, mold-opening curing continues for 6-8 days (e.g. 6-7 days, 6 days or 7 days) in the condition of 50-60° C. (e.g. 55° C., 60° C. or 50° C.), ≤20% relative humidity (e.g. 20%).

During the curing, by the activation of NaOH and $Na_2SiO_3$, the geopolymer gel forms when the Si and Al in metastable materials are dissolved out and then polymerized to form the Si—Al—O chain reticular polymer by the bridging function of Na ions. The geopolymer gel with mechanical strength completes the third solidification and stabilization of heavy metals. The purpose of the two curing stages is to avoid the destruction of magnesium oxychloride aggregate by $H_2O$. The geopolymer will produce 60%-70% strength in the first curing stage, and then the water will be lost and the strength will be continued growing in second curing stages (mold-opening curing).

According to this method, the mechanical strength of waterproof magnesium oxychloride refractory brick is not lower than 18 MPa, the fire resistance temperature is higher than 1450-1550□, and the water-resistance softening coefficient is not lower than 0.80.

The invention provides waterproof magnesium oxychloride refractory brick prepared by the above method.

The invention also provides the application of the waterproof magnesium oxychloride refractory brick, in at least one of the following 1)-6):

1) Waterproof brick;
2) Refractory bricks;
3) Thermal insulation interior wall construction;
4) Thermal insulation walls for outdoor or hydraulic structures;
5) Interior firewalls construction;
6) Firewalls for outdoor or hydraulic structures.

The invention has the following beneficial effects:

1. Wide applicability. The technology of making waterproof magnesium oxychloride refractory brick by fly ash from municipal solid waste incineration can utilizes municipal solid waste incineration fly ash from different regions and different furnace types.

2. Simple craft. In the technology of making waterproof magnesium oxychloride refractory brick by fly ash from municipal solid waste incineration, there is no special requirements for the equipment, only asking for temperature controlling, feeding, mixing, crushing. The process is simple and reliable.

3. Solidification and stabilization of heavy metals. Complying with the process and parameter of the technology, the heavy metals in fly ash can be stabilized by multi-stage solidification efficiently.

4. Environment-friendly. Complying with the process and parameter of the technology, the fly ash, as a hazardous waste, can be safely used, and environmental issues from the fly ash can be addressed.

5. Good social and economic benefit. The technology of making waterproof magnesium oxychloride refractory brick by fly ash from municipal solid waste incineration, not only achieves solidification and stabilization of the heavy metals for using the fly ash to make building materials, but also improves the water resistance of magnesium oxychloride refractory brick, enlarges the service conditions of magnesium oxychloride refractory brick.

The invention provides a method of making waterproof magnesium oxychloride refractory brick by fly ash from municipal solid waste incineration, which is reliable, simple, efficient for using fly ash from different regions and different furnace types. It not only achieves solidification and stabilization of the heavy metals for using the fly ash to make building materials, but also improves the water resistance of magnesium oxychloride refractory brick.

DESCRIPTION OF DRAWINGS

The FIGURE is a flowchart of the invention for making waterproof magnesium oxychloride refractory brick using fly ash from municipal solid waste incineration.

SPECIFIC IMPLEMENTATION METHODS

The experimental methods used in the following embodiments are conventional methods without special description.

Materials, reagents, etc. used in the following embodiments can be obtained from commercial channels without special description.

The mechanical strength of waterproof magnesia oxychloride refractory bricks prepared in the following embodiments is determined by the method disclosed in the reference standard No. GB2542. The softening coefficient is an expression parameter of water resistance, and the expression is K=f/F. K: the softening coefficient of materials; f: the unconfined compressive strength of materials under water saturation, MPa; F: the unconfined compressive strength of materials under dry condition, MPa.

Embodiment 1. Making Waterproof Magnesia Oxychloride Refractory Bricks from Municipal Solid Waste Incineration Fly Ash The fly ash samples were collected from a municipal solid waste incineration plant in Daxing District, Beijing. The contents of heavy metals in the samples and the leaching amount are shown in Table 1. The leaching method refers to "Level Oscillation Method for Toxicity Leaching of Solid Waste" (HJ557-2010), and the limit standard refers to "Surface Water Environmental Quality Standard" (GB3838-2002) V water body standard. Table 1 shows that the leaching amount of Pb is seriously over the standard.

TABLE 1

| Heavy Metals Content and Leaching Amount in Fly Ash of a Waste Incineration Plant in Daxing, Beijing | | | | | | | | |
|---|---|---|---|---|---|---|---|---|
| Heavy metal | Zn | Pb | Cu | Cr | Cd | Ni | Hg | As |
| Content/mg/kg | 1070.56 | 491.13 | 173.1 | 62.25 | 30.11 | 19.45 | 76.87 | 4.85 |
| Leaching quantity/mg/L | 1.26 | 5.68 | 0.07 | 0.04 | 0.001 | 0.02 | 0.005 | 0.01 |
| Water standard of class V | 2 | 0.1 | 1 | 0.1 | 0.01 | — | 0.001 | 0.1 |

According to the flow chart shown in the FIGURE, waterproof magnesia oxychloride refractory bricks are made from municipal solid waste incineration fly ash. The specific steps are as follows:

(1) Heavy Metal Stabilization:

The $Na_2S$ equal to 6% of the fly ash (dry ash) mass and 40% reclaimed water heated to 45° C. are added into fly ash and stirred for 20 minutes at 45° C. for heavy metal stabilization and CaO turning to $Ca(OH)_2$, to obtain the stabilized slurry.

(2) Magnesium Oxychloride Pulping:

85# lightly burnt magnesia is added into the stabilized slurry from step (1), and the amount of MgO is increased to 40% of the fly ash mass (dry material), the mixture is stirred until homogeneous. 15% industrial grade magnesium chloride of fly ash (dry material) mass and the 45% reclaimed water are used for $MgCl_2$ solution preparation, after adding the MgO, the $MgCl_2$ solution is added into the stabilized slurry, after 5 min mixing at 45° C., the magnesium oxychloride slurry is prepared.

(3) Curing and Growth:

The magnesium oxychloride paste from step (2) is put in mold and cured for 3 days in rainproof and well ventilated environment at 22° C. outdoor temperature. Then the mold is opened and followed with a four-day maintenance to get the magnesium oxychloride gelatin. The compressive strength of magnesium oxychloride gel is 42.2 MPa, 45.7 MPa and 58.5 MPa.

(4) Crushing:

The magnesium oxychloride gel in step (3) is crushed below to 4 mesh (particle size<4.75 mm) to obtain magnesium oxychloride aggregate.

(5) The Metastable Materials is Mixed for Pulping:

The I grade fly ash, NaOH, $Na_2SiO_3$, magnesium oxychloride aggregate from step (4) and the reclaimed water are mixed under 25° C. for pulping, the quality ratio of magnesium oxychloride aggregate:fly ash:NaOH:$Na_2SiO_3$:reclaimed water=100:45:5:1.5:30. The mixture is stirred for 5 min to prepare the mixed slurry, and then poured into the mold immediately for curing.

(6) Curing and Molding

The mixed slurry from step (5) is cured for 1 day in the environment with 20% of RH at 75° C., then open the mold and the bricks are cured for 6 days in the environment with 20% of RH at 55° C.

After the molding, the strength of firebrick generally can reach 18.5 MPa, 22.6 MPa and 24.5 MPa, the tolerance temperature can reach 1450° C., softening coefficient of water resistance can reach 0.81, 0.82 and 0.85, and the heavy metal leaching quantity can meet III grade water quality requirements (Table 2). The firebrick can be used for the construction of insulation wall, fire wall, fire partition wall of outdoor or hydraulic structure, etc.

TABLE 2

Heavy metal leaching amount of fly ash resource-based brick products in Daxing, Beijing

| Heavy metal | Zn | Pb | Cu | Cr | Cd | Ni | Hg | As |
|---|---|---|---|---|---|---|---|---|
| Leaching quantity/mg/L | 0.25 | 0.041 | 0.446 | 0.04 | 0.004 | 0.008 | N.D. | N.D. |
| Water standard of class III | 1 | 0.05 | 1 | 0.05 | 0.005 | — | 0.0001 | 0.05 |

Implementation of Example 2, the waterproof magnesia oxychloride firebricks are made by municipal solid waste incineration fly ash.

Fly ash samples are from a waste incinerator in Xingtai, Heibei province, and the heavy metal content and heavy metal leaching amount of samples are shown in Table 3. Leaching method refers to the Horizontal Oscillation Method for Solid Waste Toxicity Leaching (HJ557-2010), the limited standards refers to V class standard in the Standard of Surface Water Environmental Quality (GB3838-2002). Table 7 shows that the leaching amount of Pb and Zn exceed the standard.

TABLE 3

Heavy metals content and heavy metal leaching amount in fly ash of a waste incineration plant in Xingtai, Heibei province.

| Heavy metal | Zn | Pb | Cu | Cr | Cd | Ni | Hg | As |
|---|---|---|---|---|---|---|---|---|
| Content/mg/kg | 1588.54 | 423.13 | 175.1 | 100.45 | 15.11 | 27.05 | 24.57 | 1.85 |
| Leaching quantity/mg/L | 2.16 | 2.68 | 0.04 | 0.04 | 0.001 | 0.001 | N.D. | 0.011 |
| Water standard of class V | 2 | 0.1 | 1 | 0.1 | 0.01 | — | 0.001 | 0.1 |

The waterproof magnesium oxychloride firebricks are made with fly ash from domestic waste incineration according to the flow chart in the FIGURE, the specific steps are as follows:

(1) Heavy Metal Stabilization:

The $Na_2S$ equal to 9% of the fly ash (dry ash) mass and 40% reclaimed water heated to 45° C. are added into fly ash and stirred for 20 minutes at 45° C. for heavy metal stabilization and CaO turning to $Ca(OH)_2$, to obtain the stabilized slurry.

(2) Magnesium Oxychloride Pulping:

85 # lightly burnt magnesia is added into the stabilized slurry from step (1), and the amount of MgO is increased to 40% of the fly ash mass (dry material), the mixture is stirred until homogeneous. 13% industrial grade magnesium chloride of fly ash (dry material) mass and the 45% reclaimed water are used for $MgCl_2$ solution preparation, after adding the MgO, the $MgCl_2$ solution is added into the stabilized slurry, after 5 min mixing at 45° C., the magnesium oxychloride slurry is prepared.

(3) Curing and Growth:

The magnesium oxychloride paste from step (2) is put in mold and cured for 3 days in rainproof and well ventilated environment at 20° C. outdoor temperature. Then the mold is opened and followed with a four-day maintenance to get the magnesium oxychloride gelatin. The compressive strength of magnesium oxychloride gel is 56.2 MPa, 41.3 MPa and 45.5 MPa.

(4) Crushing:

The magnesium oxychloride gel in step (3) is crushed below to 4 mesh (particle size<4.75 mm) to obtain magnesium oxychloride aggregate.

(5) The Metastable Materials is Mixed for Pulping:

The II grade fly ash, NaOH, $Na_2SiO_3$, magnesium oxychloride aggregate from step (4) and the reclaimed water are mixed under 25° C. for pulping, the quality ratio of magnesium oxychloride aggregate:fly ash:NaOH:$Na_2SiO_3$:reclaimed water=100:45:5:1.5:30. The mixture is stirred for 5 min to prepare the mixed slurry, and then poured into the mold immediately for curing.

(6) Curing and Molding

The mixed slurry from step (5) is cured for 1 day in the environment with 20% of RH at 75° C., then open the mold and the bricks are cured for 6 days in the environment with 20% of RH at 60° C.

After the molding, the strength of firebrick generally can reach 19.6 MPa, 26.6 MPa and 27.5 MPa, the tolerance temperature can reach 1450° C., softening coefficient of water resistance can reach 0.80, 0.83 and 0.84, and the heavy metal leaching quantity can meet III grade water quality requirements (Table 4). The firebrick can be used for the construction of insulation wall, fire wall, fire partition wall of outdoor or hydraulic structure, etc.

TABLE 4

Heavy metal leaching amount of fly ash resource-based brick products in Xingtai, Hebei Province.

| Heavy metal | Zn | Pb | Cu | Cr | Cd | Ni | Hg | As |
|---|---|---|---|---|---|---|---|---|
| Leaching quantity/mg/L | 0.51 | 0.045 | 0.345 | 0.04 | 0.003 | N.D. | N.D. | N.D. |
| Water standard of class III | 1 | 0.05 | 1 | 0.05 | 0.005 | — | 0.0001 | 0.05 |

Implementation of Example 3, the waterproof magnesia oxychloride firebricks are made by municipal solid waste incineration fly ash.

Fly ash samples are from a waste incinerator in Linqu, Shandong province, and the heavy metal content and heavy metal leaching amount of samples are shown in Table 5. Leaching method refers to the Horizontal Oscillation Method for Solid Waste Toxicity Leaching (HJ557-2010), the limited standards refers to V class standard in the Standard of Surface Water Environmental Quality (GB3838-2002). Table 5 shows that the leaching amount of Pb and Zn exceed the standard.

TABLE 5

Heavy metals content and heavy metal leaching amount in fly ash of a waste incineration plant in Linqu, Shandong Province.

| Heavy metal | Zn | Pb | Cu | Cr | Cd | Ni | Hg | As |
|---|---|---|---|---|---|---|---|---|
| Content/mg/kg | 879.06 | 691.13 | 103.17 | 97.25 | 55.01 | 9.08 | 1.57 | 2.56 |
| Leaching quantity/mg/L | 1.06 | 6.01 | 0.02 | 0.14 | 0.001 | 0.01 | N.D. | 0.01 |
| Water standard of class V | 2 | 0.1 | 1 | 0.1 | 0.01 | — | 0.001 | 0.1 |

The waterproof magnesium oxychloride firebricks are made with fly ash from domestic waste incineration according to the flow chart in the FIGURE, the specific steps are as follows:

(1) Heavy Metal Stabilization:

The $Na_2S$ equal to 7% of the fly ash (dry ash) mass and 50% reclaimed water heated to 45° C. are added into fly ash and stirred for 20 minutes at 45° C. for heavy metal stabilization and CaO turning to $Ca(OH)_2$, to obtain the stabilized slurry.

(2) Magnesium Oxychloride Pulping:

85# lightly burnt magnesia is added into the stabilized slurry from step (1), and the amount of MgO is increased to 40% of the fly ash mass (dry material), the mixture is stirred until homogeneous. 15% industrial grade magnesium chloride of fly ash (dry material) mass and the 55% reclaimed water are used for $MgCl_2$ solution preparation, after adding the MgO, the $MgCl_2$ solution is added into the stabilized slurry, after 5 min mixing at 45° C., the magnesium oxychloride slurry is prepared.

(3) Curing and Growth:

The magnesium oxychloride paste from step (2) is put in mold and cured for 3 days in rainproof and well ventilated environment at 25° C. outdoor temperature. Then the mold is opened and followed with a four-day maintenance to get the magnesium oxychloride gelatin. The compressive strength of magnesium oxychloride gel is 37.6 MPa, 52.4 MPa and 49.5 MPa.

(4) Crushing:

The magnesium oxychloride gel in step (3) is crushed below to 4 mesh (particle size<4.75 mm) to obtain magnesium oxychloride aggregate.

(5) The Metastable Materials is Mixed for Pulping:

The crushing blast furnace slag (under 200 mesh sieve), NaOH, $Na_2SiO_3$, magnesium oxychloride aggregate from step (4) and the reclaimed water are mixed under 25° C. for pulping, the quality ratio of magnesium oxychloride aggregate:crushing blast furnace slag:NaOH:$Na_2SiO_3$:reclaimed water=100:45:5:1.5:25. The mixture is stirred for 5 min to prepare the mixed slurry, and then poured into the mold immediately for curing.

(6) Curing and Molding

The mixed slurry from step (5) is cured for 1 day in the environment with 20% of RH at 70° C., then open the mold and the bricks are cured for 6 days in the environment with 20% of RH at 60° C.

After the molding, the strength of firebrick generally can reach 18.9 MPa, 26.5 MPa and 24.2 MPa, the tolerance temperature can reach 1500° C., softening coefficient of water resistance can reach 0.80, 0.81 and 0.83, and the heavy metal leaching quantity can meet III grade water quality requirements (Table 6). The firebrick can be used for the construction of insulation wall, fire wall, fire partition wall of outdoor or hydraulic structure, etc.

TABLE 6

| Heavy metal leaching amount of fly ash resource-based brick products in Xingtai, Hebei Province. | | | | | | | | |
|---|---|---|---|---|---|---|---|---|
| Heavy metal | Zn | Pb | Cu | Cr | Cd | Ni | Hg | As |
| Leaching quantity/mg/L | 0.21 | 0.015 | 0.657 | N.D. | 0.003 | 0.001 | N.D. | N.D. |
| Water standard of class III | 1 | 0.05 | 1 | 0.05 | 0.005 | — | 0.0001 | 0.05 |

Implementation of Example 4, the waterproof magnesia oxychloride firebricks are made by municipal solid waste incineration fly ash.

Fly ash samples are from a waste incinerator in Dehui, Jiling, and the heavy metal content and heavy metal leaching amount of samples are shown in Table 7. Leaching method refers to the Horizontal Oscillation Method for Solid Waste Toxicity Leaching (HJ557-2010), the limited standards refers to V class standard in the Standard of Surface Water Environmental Quality (GB3838-2002). Table 7 shows that the leaching amount of Pb, Zn and Cr exceed the standard.

TABLE 7

| Heavy metals content and heavy metal leaching amount in fly ash of a waste incineration plant in Dehui, Jilin. | | | | | | | | |
|---|---|---|---|---|---|---|---|---|
| Heavy metal | Zn | Pb | Cu | Cr | Cd | Ni | Hg | As |
| Content/mg/kg | 1170.56 | 293.12 | 167.1 | 38.25 | 55.11 | 19.55 | 15.54 | 7.55 |
| Leaching quantity/mg/L | 2.26 | 2.48 | 0.04 | 0.02 | 0.011 | 0.01 | N.D. | 0.03 |
| Water standard of class V | 2 | 0.1 | 1 | 0.1 | 0.01 | — | 0.001 | 0.1 |

The waterproof magnesium oxychloride firebricks are made with fly ash from domestic waste incineration according to the flow chart in the FIGURE, the specific steps are as follows:

(1) Heavy Metal Stabilization:

The $Na_2S$ equal to 8% of the fly ash (dry ash) mass and 40% reclaimed water heated to 50° C. are added into fly ash and stirred for 20 minutes at 50° C. for heavy metal stabilization and CaO turning to $Ca(OH)_2$, to obtain the stabilized slurry.

(2) Magnesium Oxychloride Pulping:

85 # lightly burnt magnesia is added into the stabilized slurry from step (1), and the amount of MgO is increased to 40% of the fly ash mass (dry material), the mixture is stirred until homogeneous. 13% industrial grade magnesium chloride of fly ash (dry material) mass and the 45% reclaimed water are used for $MgCl_2$ solution preparation, after adding the MgO, the $MgCl_2$ solution is added into the stabilized slurry, after 5 min mixing at 50° C., the magnesium oxychloride slurry is prepared.

(3) Curing and Growth:

The magnesium oxychloride paste from step (2) is put in mold and cured for 3 days in rainproof and well ventilated environment at 22° C. outdoor temperature. Then the mold is opened and followed with a four-day maintenance to get the magnesium oxychloride gelatin. The compressive strength of magnesium oxychloride gel is 45.6 MPa, 41.2 MPa and 54.2 MPa.

(4) Crushing:

The magnesium oxychloride gel in step (3) is crushed below to 4 mesh (particle size<4.75 mm) to obtain magnesium oxychloride aggregate.

(5) The Metastable Materials is Mixed for Pulping:

The I grade fly ash, NaOH, $Na_2SiO_3$, magnesium oxychloride aggregate from step (4) and the reclaimed water are mixed under 25° C. for pulping, the quality ratio of magnesium oxychloride aggregate:fly ash:NaOH:$Na_2SiO_3$:reclaimed water=100:45:5:1.5:35. The mixture is stirred for 5 min to prepare the mixed slurry, and then poured into the mold immediately for curing.

(6) Curing and Molding

The mixed slurry from step (5) is cured for 1 day in the environment with 20% of RH at 75° C., then open the mold and the bricks are cured for 7 days in the environment with 20% of RH at 55° C.

After the molding, the strength of firebrick generally can reach 19.9 MPa, 25.5 MPa and 23.5 MPa, the tolerance temperature can reach 1450° C., softening coefficient of water resistance can reach 0.81, 0.81 and 0.82, and the heavy metal leaching quantity can meet III grade water quality requirements (Table 8). The firebrick can be used for the construction of insulation wall, fire wall, fire partition wall of outdoor or hydraulic structure, etc.

TABLE 8

| Heavy metal leaching amount of fly ash resource-based brick products in Dehui, Jilin. | | | | | | | | |
|---|---|---|---|---|---|---|---|---|
| Heavy metal | Zn | Pb | Cu | Cr | Cd | Ni | Hg | As |
| Leaching quantity/mg/L | 0.57 | 0.045 | 0.25 | 0.004 | 0.002 | N.D. | N.D. | 0.009 |

TABLE 8-continued

| Heavy metal leaching amount of fly ash resource-based brick products in Dehui, Jilin. | | | | | | | | |
|---|---|---|---|---|---|---|---|---|
| Heavy metal | Zn | Pb | Cu | Cr | Cd | Ni | Hg | As |
| Water standard of class III | 1 | 0.05 | 1 | 0.05 | 0.005 | — | 0.0001 | 0.05 |

Implementation of Example 5, the waterproof magnesia oxychloride firebricks are made by municipal solid waste incineration fly ash.

Fly ash samples are from a waste incinerator in Kaixian, Chongqing province, and the heavy metal content and heavy metal leaching amount of samples are shown in Table 9. Leaching method refers to the Horizontal Oscillation Method for Solid Waste Toxicity Leaching (HJ557-2010), the limited standards refers to V class standard in the Standard of Surface Water Environmental Quality (GB3838-2002). Table 7 shows that the leaching amount of Pb, Zn, Cd and Cr exceed the standard.

TABLE 9

| Heavy metals content and heavy metal leaching amount in fly ash of a waste incineration plant in Kaixian, Chongqing Province. | | | | | | | | |
|---|---|---|---|---|---|---|---|---|
| Heavy metal | Zn | Pb | Cu | Cr | Cd | Ni | Hg | As |
| Content/mg/kg | 951.25 | 490.16 | 203.1 | 24.25 | 12.11 | 11.45 | 6.87 | N.D. |
| Leaching quantity/mg/L | 2.11 | 2.68 | 0.27 | 0.11 | 0.015 | 0.01 | N.D. | N.D. |
| Water standard of class V | 2 | 0.1 | 1 | 0.1 | 0.01 | — | 0.001 | 0.1 |

The waterproof magnesium oxychloride firebricks are made with fly ash from domestic waste incineration according to the flow chart in the FIGURE, the specific steps are as follows:

(1) Heavy Metal Stabilization:

The $Na_2S$ equal to 8% of the fly ash (dry ash) mass and 40% reclaimed water heated to 50° C. are added into fly ash and stirred for 20 minutes at 50° C. for heavy metal stabilization and CaO turning to $Ca(OH)_2$, to obtain the stabilized slurry.

(2) Magnesium Oxychloride Pulping:

85# lightly burnt magnesia is added into the stabilized slurry from step (1), and the amount of MgO is increased to 40% of the fly ash mass (dry material), the mixture is stirred until homogeneous. 15% industrial grade magnesium chloride of fly ash (dry material) mass and the 55% reclaimed water are used for $MgCl_2$ solution preparation, after adding the MgO, the $MgCl_2$ solution is added into the stabilized slurry, after 5 min mixing at 50° C., the magnesium oxychloride slurry is prepared.

(3) Curing and Growth:

The magnesium oxychloride paste from step (2) is put in mold and cured for 3 days in rainproof and well ventilated environment at 20° C. outdoor temperature. Then the mold is opened and followed with a four-day maintenance to get the magnesium oxychloride gelatin. The compressive strength of magnesium oxychloride gel is 56.5 MPa, 42.2 MPa and 60.2 MPa.

(4) Crushing:

Break the magnesium oxychloride gel in step (3) below to 4 mesh (particle size<4.75 mm) to obtain magnesium oxychloride aggregate.

(5) The Metastable Materials is Mixed for Pulping:

The class II fly ash, NaOH, $Na_2SiO_3$, magnesium oxychloride aggregate from step (4) and the reclaimed water are mixed under 25° C. for pulping, the quality ratio of magnesium oxychloride aggregate:fly ash:NaOH:$Na_2SiO_3$:reclaimed water=100: 45:5:1.5:25. The mixture is stirred for 5 min to prepare the mixed slurry, and then poured into the mold immediately for curing.

(6) Curing and Molding

The mixed slurry from step (5) is cured for 1 day in the environment with 20% of RH at 75° C., then open the mold and the bricks are cured for 6 days in the environment with 20% of RH at 50° C.

After the molding, the strength of firebrick generally can reach 18.9 MPa, 19.5 MPa and 18.6 MPa, the tolerance temperature can reach 1450° C., softening coefficient of water resistance can reach 0.82, 0.82 and 0.83, and the heavy metal leaching quantity can meet III grade water quality requirements (Table 10). The firebrick can be used for the construction of insulation wall, fire wall, fire partition wall of outdoor or hydraulic structure, etc.

TABLE 10

| Heavy metal leaching amount of fly ash resource-based brick products in Kaixian, Chongqing Province. | | | | | | | | |
|---|---|---|---|---|---|---|---|---|
| Heavy metal | Zn | Pb | Cu | Cr | Cd | Ni | Hg | As |
| Leaching quantity/mg/L | 0.45 | 0.015 | 0.65 | 0.002 | 0.004 | N.D. | N.D. | 0.015 |

TABLE 10-continued

Heavy metal leaching amount of fly ash resource-based brick products in Kaixian, Chongqing Province.

| Heavy metal | Zn | Pb | Cu | Cr | Cd | Ni | Hg | As |
|---|---|---|---|---|---|---|---|---|
| Water standard of class III | 1 | 0.05 | 1 | 0.05 | 0.005 | — | 0.0001 | 0.05 |

Implementation of Example 6, the waterproof magnesia oxychloride firebricks are made by municipal solid waste incineration fly ash.

Fly ash samples are from a waste incinerator in Dezhou, Shandong province, and the heavy metal content and heavy metal leaching amount of samples are shown in Table 11. Leaching method refers to the Horizontal Oscillation Method for Solid Waste Toxicity Leaching (HJ557-2010), the limited standards refers to V class standard in the Standard of Surface Water Environmental Quality (GB3838-2002). Table 11 shows that the leaching amount of Pb, Zn and Cd exceed the standard.

TABLE 11

Heavy metals content and heavy metal leaching amount in fly ash of a waste incineration plant in Dezhou, Shandong province.

| Heavy metal | Zn | Pb | Cu | Cr | Cd | Ni | Hg | As |
|---|---|---|---|---|---|---|---|---|
| Content/mg/kg | 980.56 | 501.51 | 203.15 | 18.54 | 24.11 | 11.45 | 14.37 | 10.53 |
| Leaching quantity/mg/L | 2.01 | 1.12 | 0.05 | 0.01 | 0.011 | 0.02 | N.D. | N.D. |
| Water standard of class V | 2 | 0.1 | 1 | 0.1 | 0.01 | — | 0.001 | 0.1 |

The waterproof magnesium oxychloride firebricks are made with fly ash from domestic waste incineration according to the flow chart in the FIGURE, the specific steps are as follows:

(1) Heavy Metal Stabilization:

The $Na_2S$ equal to 9% of the fly ash (dry ash) mass and 50% reclaimed water heated to 50° C. are added into fly ash and stirred for 20 minutes at 50° C. for heavy metal stabilization and CaO turning to $Ca(OH)_2$, to obtain the stabilized slurry.

(2) Magnesium Oxychloride Pulping:

85# lightly burnt magnesia is added into the stabilized slurry from step (1), and the amount of MgO is increased to 40% of the fly ash mass (dry material), the mixture is stirred until homogeneous. 13% industrial grade magnesium chloride of fly ash (dry material) mass and the 50% reclaimed water are used for $MgCl_2$ solution preparation, after adding the MgO, the $MgCl_2$ solution is added into the stabilized slurry, after 5 min mixing at 50° C., the magnesium oxychloride slurry is prepared.

(3) Curing and Growth:

The magnesium oxychloride paste from step (2) is put in mold and cured for 3 days in rainproof and well ventilated environment at 25° C. outdoor temperature. Then the mold is opened and followed with a four-day maintenance to get the magnesium oxychloride gelatin. The compressive strength of magnesium oxychloride gel is 45.6 MPa, 49.5 MPa and 45.6 MPa.

(4) Crushing:

Break the magnesium oxychloride gel in step (3) below to 4 mesh (particle size<4.75 mm) to obtain magnesium oxychloride aggregate.

(5) The Metastable Materials is Mixed for Pulping:

The class II fly ash, NaOH, $Na_2SiO_3$, magnesium oxychloride aggregate from step (4) and the reclaimed water are mixed under 25° C. for pulping, the quality ratio of magnesium oxychloride aggregate:fly ash:NaOH:$Na_2SiO_3$:reclaimed water=100:45:5:1.5:30. The mixture is stirred for 5 min to prepare the mixed slurry, and then poured into the mold immediately for curing.

(6) Curing and Molding

The mixed slurry from step (5) is cured for 1 day in the environment with 20% of RH at 70° C., then open the mold and the bricks are cured for 7 days in the environment with 20% of RH at 50° C.

After the molding, the strength of firebrick generally can reach 18.8 MPa, 19.6 MPa and 20.5 MP, the tolerance temperature can reach 1450° C., softening coefficient of water resistance can reach 0.82, 0.82 and 0.85, and the heavy metal leaching quantity can meet III grade water quality requirements (Table 12). The firebrick can be used for the construction of insulation wall, fire wall, fire partition wall of outdoor or hydraulic structure, etc.

TABLE 12

Heavy metal leaching amount of fly ash resource-based brick products in Dezhou, Shandong Province.

| Heavy metal | Zn | Pb | Cu | Cr | Cd | Ni | Hg | As |
|---|---|---|---|---|---|---|---|---|
| Leaching quantity/mg/L | 0.84 | 0.046 | 0.48 | 0.002 | 0.004 | 0.006 | N.D. | N.D. |
| Water standard of class III | 1 | 0.05 | 1 | 0.05 | 0.005 | — | 0.0001 | 0.05 |

The invention claimed is:

1. A method of making waterproof magnesium oxychloride refractory brick using fly ash from municipal solid waste incineration comprising the steps of:
   (1) mixing a sulfur-containing compound and water with the fly ash to form a slurry and stirring the slurry to obtain a stabilized slurry in which heavy metals are stabilized and CaO is converted to $Ca(OH)_2$, wherein the sulfur-containing compound is selected from the group consisting of inorganic sulfides, organic sulfides, and mixtures thereof;
   (2) adding MgO and an aqueous solution of $MgCl_2$ into the stabilized slurry and stirring to obtain a magnesium oxychloride slurry;
   (3) curing the magnesium oxychloride slurry to obtain a magnesium oxychloride gel;
   (4) crushing the magnesium oxychloride gel to obtain a magnesium oxychloride aggregate;
   (5) preparing a blended slurry by mixing a metastable material, an alkali metal hydroxide, $Na_2SiO_3$, water, and the magnesium oxychloride aggregate;
   (6) shaping and curing the blended slurry to obtain a waterproof magnesium oxychloride refractory brick.

2. The method according to claim 1, wherein the sulfur-containing compound is $Na_2S$.

3. The method according to claim 1, wherein the added amount of the sulfur-containing compound is 6%~9% of fly ash dry mass; and the added amount of the water is 40%-50% of fly ash dry mass.

4. The method according to claim 1, wherein in step (1) the mixing is conducted at a temperature of 40-50° C. and continued for a period of 15-30 minutes.

5. The method according to claim 1,
   wherein in step (2), the added amount of MgO is 35%-45% of fly ash dry mass;
   wherein the added amount of $MgCl_2$ in the aqueous solution of the $MgCl_2$ is 13%-16% of fly ash dry mass, and
   further wherein the added amount of water is 45%-55% of fly ash dry mass.

6. The method according to claim 1, wherein in step (2), the stirring is conducted at a temperature of 40-50° C.; and continued for a period of 5-10 minutes.

7. The method according to claim 1, wherein in step (3), the curing is conducted by placing the magnesium oxychloride slurry in a mold and maintaining the mold in a ventilated enclosure and protected from rain dry conditions, at a curing temperature of 20-25° C.

8. The method according to claim 7, wherein in step (3), the time of curing in mold is 2-4 days, and the time of the mold-opening curing is 3-5 days after curing in mold.

9. The method according to claim 1, wherein in step (4), the magnesium oxychloride gel is crushed to a particle size of less than 4 mesh (particle size<4.75 mm).

10. The method according to claim 1, wherein in step (5), the mass ratio of the magnesium oxychloride aggregate, metastable material, alkali metal hydroxide, $Na_2SiO_3$, and the water is within a range of 100:(40-55):5:1.5:(25-35).

11. The method according to claim 1, wherein in step (5), the alkali metal hydroxides are selected from the group consisting of NaOH, KOH, and mixtures thereof; and the metastable material is selected from the group consisting of grade 1 fly ash, grade 2 fly ash, blast furnace slag, metakaolin, and mixtures thereof.

12. The method according to claim 1, wherein in step (5), the particle size of the metastable material is less than 75 μm; and a mixing duration is 5 to 10 minutes.

13. The method according to claim 1, wherein in step (6), the curing in mold is in the condition of 70-80° C. and <20% relative humidity; the time of curing in mold is 1 day; the mold-opening curing is in the condition of 50-60° C. and <20% relative humidity; and the time of mold-opening curing is 6-8 days.

* * * * *